United States Patent
Vincenzoni et al.

(10) Patent No.: US 10,089,078 B2
(45) Date of Patent: Oct. 2, 2018

(54) CIRCUIT FOR PERFORMING A MULTIPLY-AND-ACCUMULATE OPERATION

(71) Applicant: STMicroelectronics S.r.l., Agrate Brianza (IT)

(72) Inventors: David Vincenzoni, Usmate Velate (IT); Samuele Raffaelli, Arezzo (IT)

(73) Assignee: STMICROELECTRONICS S.R.L., Agrate Brianza (MB) (IT)

( * ) Notice: Subject to any disclaimer, the term of this patent is extended or adjusted under 35 U.S.C. 154(b) by 56 days.

(21) Appl. No.: 15/275,037

(22) Filed: Sep. 23, 2016

(65) Prior Publication Data

US 2018/0088908 A1   Mar. 29, 2018

(51) Int. Cl.
  *G06F 7/48* (2006.01)
  *G06F 7/544* (2006.01)

(52) U.S. Cl.
  CPC .................... *G06F 7/5443* (2013.01)

(58) Field of Classification Search
  None
  See application file for complete search history.

(56) References Cited

U.S. PATENT DOCUMENTS

| | | | | |
|---|---|---|---|---|
| 5,241,492 A * | 8/1993 | Girardeau, Jr. | ............ | G06F 7/57 708/523 |
| 6,606,700 B1 * | 8/2003 | Sih | ........................ | G06F 7/4812 708/501 |
| 6,643,768 B2 * | 11/2003 | Ganapathy | ............ | G06F 9/3001 708/501 |
| 7,873,815 B2 * | 1/2011 | Sih | ........................ | G06F 9/30014 708/523 |
| 8,112,466 B2 * | 2/2012 | Minz | ........................ | G06F 15/7867 708/230 |
| 8,543,634 B1 | 9/2013 | Xu et al. | | |
| 9,613,232 B1 * | 4/2017 | Langhammer | ............ | G06G 7/16 |
| 2005/0235025 A1 * | 10/2005 | Aldrich | ................ | G06F 7/5443 708/523 |
| 2009/0077154 A1 * | 3/2009 | Matsuyama | .......... | G06F 7/5443 708/523 |
| 2014/0095572 A1 | 4/2014 | Bahary et al. | | |
| 2014/0379774 A1 * | 12/2014 | Gupta | ..................... | G06F 17/10 708/523 |

* cited by examiner

*Primary Examiner* — David H Malzahn
(74) *Attorney, Agent, or Firm* — Slater Matsil, LLP

(57) ABSTRACT

A circuit includes a multiplier, an adder, a first result register and a second result register coupled to outputs of the multiplier and the adder, respectively. The circuit further includes: a first selection unit configured to selectively provide, to the multiplier and in response to a first control signal, a first value from a first plurality of values; and a second selection unit configured to selectively provide, to the multiplier and in response to a second control signal, a second value from a second plurality of values. The circuit also includes: a third selection unit configured to selectively provide, to the adder and in response to a third control signal, a third value from a third plurality of values; and a fourth selection unit configured to selectively provide, to the adder and in response to a fourth control signal, a fourth value from a fourth plurality of values.

19 Claims, 4 Drawing Sheets

```
;------- polynomial computation with classic mac -------
;
;-------- initialize ----------
202    ; calculation: z = 1 * a_N + 0
204    clr z              ; clear accumulator
206    mov a, #1          ; load operand 112 with 1
208    mov b, #a_N        ; load operand 114 with a_N coefficient
       mov ctr, #mac      ; program multiply-accumulate
210    nop                ; wait for calculation
       ...
       nop                ; wait for calculation
       ;                  ; z = a_N
;
;-------- replicate with i = 1,...,N ---------
; calculation: z_i = z_{i-1}*x + a_{N-i} in two steps
; 1) z' = z_{i-1}*x + 0           = z_{i-1}*x
; 2) z = a_{N-i} * 1 + z'         = z_{i-1}*x + a_{N-i}
212    mov a, z
214    mov b, #x          ; load operand 112 with z_{i-1}
216    mov b, #x          ; load operand 114 with x
218    clr z              ; clear accumulator
       mov ctr, #mac      ; program multiply-accumulate
220    nop                ; wait for calculation
       ...
       nop                ; wait for calculation
       ;                  ; z = z_{i-1}*x
222    mov a, #a_{N-i}    ; load operand 112 with a_{N-i}
224    mov b, #1          ; load operand 114 with 1
226    mov ctr, #mac      ; program multiply-accumulate
228    nop                ; wait for calculation
       ...
       nop                ; wait for calculation
       ;                  ; z = z_{i-1}*x + a_{N-i}
;
;-------- read result ---------
230    mov r0, z          ; read result from accumulator
```

FIG. 2

```
; --- polynomial computation with proposed mac ---
; --------- initialize ---------
                                                                    ⎫
; calculation: z = x * a_N + a_{N-1}                                │
mov a, #x           ; load operand A with x                         │
mov b, #a_N         ; load operand B with a_N coefficient           ⎬ 401
mov c, #a_{N-1}     ; load operand C with a_{N-1} coefficient       │
mov ctr, #mad       ; program multiply-and-add operation            │
nop                 ; wait for calculation                          ⎭
...                 ; wait for calculation
nop                 ; z = a_N*x + a_{N-1}

; -------- replicate with i = 1,...,N -1 --------
                                                                    ⎫
; calculation: z = x * z' + a_{N-1-i}                               │
mov c, #a_{N-1-i}   ; load operand C with a_{N-1-i} coefficient     ⎬ 403
mov ctr, #hor       ; program Horner's step computation             │
nop                 ; wait for calculation                          │
...                 ; wait for calculation                          │
nop                 ; z_{i+1} = z_i*x + a_{N-1-i}                   ⎭

; -------- read result --------
mov rd, z           ; read result from accumulator
```

FIG. 4

CIRCUIT FOR PERFORMING A MULTIPLY-AND-ACCUMULATE OPERATION

TECHNICAL FIELD

The present disclosure relates generally to a circuit for performing a multiply-and-accumulate operation, and, in particular embodiments, to a circuit for evaluating a polynomial.

BACKGROUND

Digital data processing requires multiplication and accumulation of data. For this purpose, digital signal processors (DSP) may include a multiply or a multiply-and-accumulate (MAC) unit, which is adapted to multiply and accumulate operands for various controlling and data processing tasks. As multiplication and accumulation of numbers is one of the basic and central data processing steps of data processing applications, there is a general motivation to improve multiply-and-accumulate units towards faster operation and reduced complexity.

SUMMARY

In an embodiment, a circuit includes a multiplier, an adder, a first result register coupled to an output of the multiplier, and a second result register coupled to an output the adder. The circuit further includes a first selection unit configured to selectively provide, to the multiplier and in response to a first control signal, a first value from a first plurality of values. The circuit additionally includes a second selection unit configured to selectively provide, to the multiplier and in response to a second control signal, a second value from a second plurality of values. The circuit also includes a third selection unit configured to selectively provide, to the adder and in response to a third control signal, a third value from a third plurality of values. The circuit further includes a fourth selection unit configured to selectively provide, to the adder and in response to a fourth control signal, a fourth value from a fourth plurality of values.

In an embodiment, a circuit includes a multiplier, a first accumulator register coupled to an output of the multiplier, an adder, and a second accumulator register coupled to an output of the adder. A first multiplexer, included in the circuit, is configured to receive, at a first input, a first operand and, at a second input, an accumulated product stored in the first accumulator register, the first multiplexer being further configured to selectively provide, as a first input to the multiplier, one of the first operand or the accumulated product. A second multiplexer, included in the circuit is configured to receive, at a first input, a second operand and, at a second input, an accumulated sum stored in the second accumulator register, the second multiplexer being further configured to selectively provide, as a second input to the multiplier, one of the second operand or the accumulated sum. A third multiplexer, included in the circuit, is configured to receive, at a first input, an output of the second multiplexer and, at a second input, the accumulated product, the third multiplexer being further configured to selectively provide, as a first input to the adder, one of the output of the second multiplexer or the accumulated product. A fourth multiplexer, included in the circuit, is configured to receive, at a first input, a third operand and, at a second input, the accumulated sum, the fourth multiplexer further configured to selectively provide, as a second input to the adder, one of the third operand or the accumulated sum.

In an embodiment, a device may include a processor and a computer-readable storage medium storing a program to be executed by the processor. The program may include instructions for evaluating an N-degree polynomial p(x) when an argument of the polynomial p(x) is equal to a value $x_S$. The instructions may include selecting, by a first multiplexer, the value $x_S$ from a first plurality of values including the value $x_S$ and an accumulated product stored in a first accumulator register. The instructions also include selecting, by a second multiplexer, an accumulated sum stored in a second accumulator register from a second plurality of values including a second operand and the accumulated sum. The instructions further include multiplying, by a multiplier, the value $x_S$ and the accumulated sum to yield a product; and selecting, by a third multiplexer, the product from a third plurality of values including the product and an output of the second multiplexer. The instructions additionally include selecting, by a fourth multiplexer, a third operand from a fourth plurality of values including the third operand and the accumulated sum, the third operand being equal to a value of a coefficient of the polynomial p(x). The instructions also include summing, by an adder, the product and the third operand to yield an addition result; and storing the addition result in the second accumulator register, the accumulated sum being updated to equal the addition result.

BRIEF DESCRIPTION OF THE DRAWINGS

For a more complete understanding of the present invention, and the advantages thereof, reference is now made to the following descriptions taken in conjunction with the accompanying drawings, in which:

FIG. 2 shows an example of code that implements Horner's method of evaluating a polynomial using the circuit shown in FIG. 1;

FIG. 4 shows an example of code that implements Horner's method of evaluating a polynomial using the circuit shown in FIG. 3, in accordance with an embodiment.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of various embodiments are discussed in detail below. It should be appreciated, however, that the various embodiments described herein are applicable in a wide variety of specific contexts. The specific embodiments discussed are merely illustrative of specific ways to make and use various embodiments, and should not be construed in a limited scope.

Conventional circuits for executing a multiply-and-accumulate (MAC) operation may be used to solve data processing steps of data processing applications that can be expressed as a sum of multiplications. One such example is the determination of a value of a polynomial at a particular argument value, and such examples arise in a wide range of applications, such as proximity detection, synchronization of the times of arrival of data packets, and error-control coding, to name a few. However, such conventional circuits may not be suitable for high-complexity computation or when faster operation is required. Improvements in multiply-and-accumulate units towards faster operation and reduced complexity may be needed.

An embodiment circuit described herein provides several advantages. The embodiment circuit has increased logic compared to a conventional circuit that executes a MAC operation. The increased logic allows the embodiment circuit to store intermediate results for both multiplication operations and addition operations. The increased logic also allows for selective feeding of values to a multiplier and an adder included in the embodiment circuit. The storage of intermediate results for both multiplication operations and addition operations may be absent in a conventional circuit that executes a MAC operation. Furthermore, a conventional circuit that executes a MAC operation may not be configured to selectively feed values to a multiplier and an adder included therein. Additionally, the embodiment circuit has enhanced flexibility compared to a conventional circuit that executes a MAC operation, since the embodiment circuit can execute a plurality of arithmetic operations atomically. Even further, the embodiment circuit is more efficient at polynomial evaluation, permitting half (or, in some cases, less than half) the number of computational steps required by a conventional circuit that executes a MAC operation.

Figure 1:
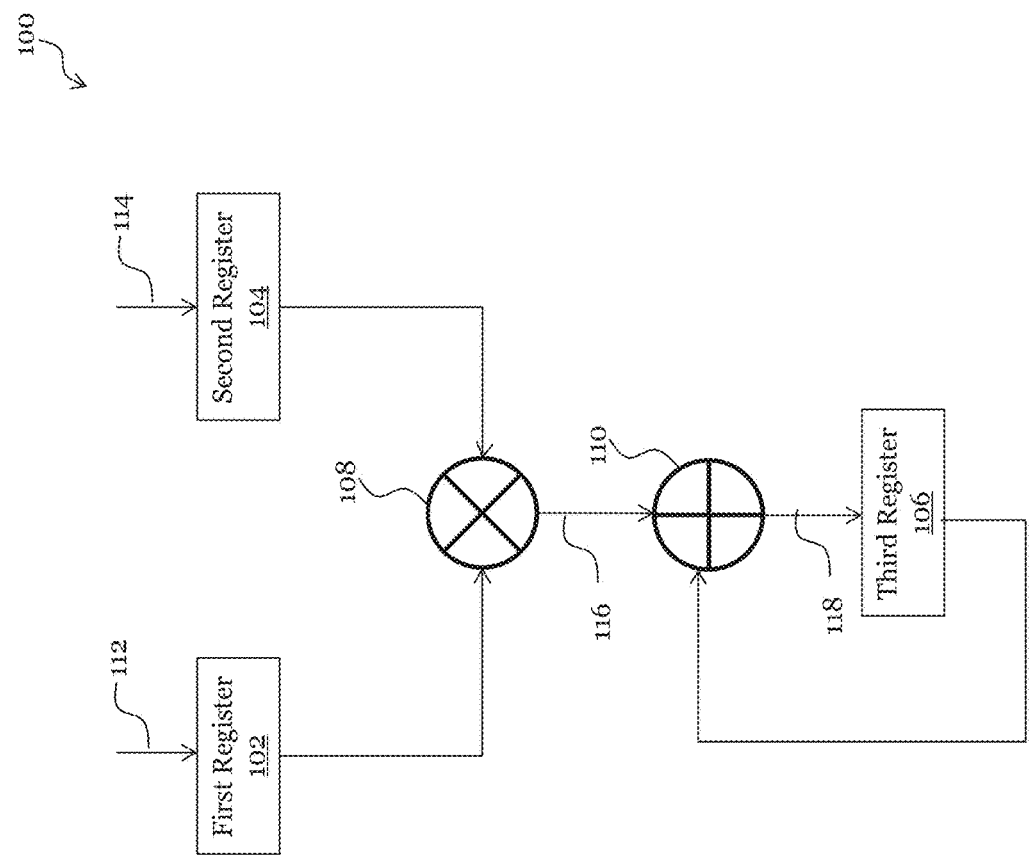
FIG. 1 shows a block diagram of a circuit that may be used to perform a multiply-and-accumulate (MAC) operation.

FIG. 1 shows a block diagram of a circuit 100 that may be used to perform a multiply-and-accumulate (MAC) operation. In some examples, circuit 100 may be included in or coupled to a controller (e.g. a core or a digital signal processor, such as an 8-bit core digital signal processor). Circuit 100 includes a first register 102, a second register 104, and a third register 106. In some examples, first register 102, second register 104, and third register 106 may be referred to as a multiplier register, a multiplicand register, and an accumulator register, respectively. Circuit 100 also includes a multiplier 108 and an adder 110. Multiplier 108 is configured to multiply the value stored in first register 102 and the value stored in second register 104 to yield a product 116, which is supplied to adder 110. The value stored in third register 106 is also provided to adder 110. Adder 110 is configured to sum the product 116 and the value stored in third register 106 to yield a sum 118. The third register 106 is subsequently updated with the value of sum 118 generated by adder 110.

As shown in FIG. 1, a first operand 112 is provided to first register 102 and a second operand 114 is provided to second register 104. In some examples, first operand 112 and second operand 114 may each be a floating-point number of a given precision. For example, each of first operand and second operand may be a 16-bit floating-point number. In such examples, first register 102 and second register 104 may each be a 16-bit register. First operand 112 and second operand 114 may be provided to circuit 100 from memory (e.g. random access memory). As described above, circuit 100 may be included in or coupled to a controller (e.g. a digital signal processor), and the controller may be configured to select the values of first operand 112 and second operand 114 from memory and to provide the selected values of first operand 112 and second operand 114 to first register 102 and second register 104.

Many real functions (such as time-domain signals, for example) may be reasonably approximated by a polynomial, and polynomial computation is performed for a wide range of applications, such as proximity detection, synchronization of the times of arrival of data packets, and error-control coding, to name a few. Suppose an $N^{th}$ degree polynomial $p(x)$ is expressed as $p(x)=a_N \cdot x^N + a_{N-1} \cdot x^{N-1} + \ldots + a_1 \cdot x + a_0$, where $a_0, a_1, \ldots, a_N$ are polynomial coefficients, and x is the argument of polynomial $p(x)$. Many applications (such as the aforementioned applications of proximity detection, synchronization of the times of arrival of data packets, and error-control coding) require evaluating the value of polynomial $p(x)$ about the point $x=x_S$. In other words, the value that polynomial $p(x)$ assumes when argument x is equal to a specific value $x_S$ can be determined by calculation.

The value $p(x_S)$ may be determined using Horner's method. Horner's method is an efficient method for evaluating the polynomial $p(x)$ about the point $x=x_S$. Horner's method may be executed with a reduced number of arithmetic operations compared to other methods of evaluating a polynomial. Horner's method may be summarized as follows:

Initialization: $z_0 = a_N$ $z_1 = z_0 \cdot x_S + a_{N-1}$      $1^{st}$ iteration:

...

$z_i = z_{i-1} \cdot x_S + a_{N-i}$      $i^{th}$ iteration:

...

$z_{N-1} = z_{N-2} \cdot x_S + a_1$      $(N-1)^{th}$ iteration:

$z_N = z_{N-1} \cdot x_S + a_0 = a_N \cdot x_S^N + a_{N-1} \cdot x_S^{N-1} + \ldots + a_1 \cdot x_S + a_0 = p(x_S)$,      $N^{th}$ iteration:

where $z_0$ is the initial value stored in third register 106, where $z_i$ is the accumulated value (e.g. accumulated sum) stored in third register 106 at the end of the $i^{th}$ iteration, where $i=1, 2, \ldots, N$. As observed from Horner's method illustrated above, evaluation of the $N^{th}$ degree polynomial $p(x)$ about the point $x=x_S$ requires N additions and N multiplications. In other words, besides the initialization step where third register 106 stores the value of coefficient $a_N$, a total of N multiply-and-accumulate (MAC) operations are required to evaluate the value $p(x_S)$.

Circuit 100 may be used for polynomial computation and in instances where the $N^{th}$ degree polynomial $p(x)$ needs to be evaluated about the point $x=x_S$. In particular, circuit 100 can be used to evaluate the value $p(x_S)$ according to Horner's method. As indicated above in the summary of Horner's method, an initialization step is performed followed by N iterations of a MAC operation.

During an initialization of circuit 100, third register 106 is cleared (e.g. to have a value 0). Additionally, initial values for first operand 112 and second operand 114 are selected (e.g. by a controller) and stored in first register 102 and second register 104. Multiplier 108 multiplies the initial values of first operand 112 and second operand 114 together to generate product 116, which is subsequently added, by adder 110, to the zero initial value stored in third register 106 to yield an initial sum 118 (which as indicated in Horner's method above, has a value of coefficient $a_N$). This initial sum 118 is stored in third register 106. As such, during initialization of circuit 100, sum 118 generated by adder 110 is equal to the product of the initial values stored in first register 102 and second register 104.

Following this initialization, the N iterations of a MAC operation is executed. Each of the N iterations may be identified as an $i^{th}$ iteration, where i is an integer value from 1 to N. Prior to the start of the $i^{th}$ iteration, the values of first operand 112 and second operand 114 for the $i^{th}$ iteration may be respectively selected (e.g. by a controller) and provided to first register 102 and second register 104. At the beginning of the $i^{th}$ iteration, first operand 112 and second operand 114 may be latched into first register 102 and second register 104, respectively. Multiplier 108, which may be implemented by one or more multiplier circuits known in the art, is configured to multiply first operand 112 and second operand 114 to yield product 116. As shown in FIG. 1, the product 116 is provided to adder 110, which may be implemented by one or more adder circuits known in the art. Adder 110 sums product 116 generated by multiplier 108 at the $i^{th}$ iteration and the currently-stored value in third register 106 (which is equal to sum 118 generated by adder 110 at the $(i-1)^{th}$ iteration, where i=1, 2, ..., N). The result of this operation is sum 118 generated by adder 110 at the $i^{th}$ iteration, and this value is stored in third register 106, thereby updating the value stored in third register 106. The above-described steps are then repeated for the $(i+1)^{th}$ iteration until all N iterations are completed. Supposing first operand 112 and second operand 114 are represented by A and B, respectively, and the value stored in third register 106 is represented by Z, then the above-described steps indicate that circuit 100 implements the operation Z←Z+(A×B) at each of the N iterations needed to evaluate the value of $p(x_S)$.

FIG. 2 shows an example of code 200 that implements Horner's method of evaluating polynomial p(x) using circuit 100. In some examples, code 200 may be assembly code for a controller that controls circuit 100. During initialization of circuit 100, the value in third register 106 is initialized to the value of the coefficient $a_N$. The initialization of circuit 100 is indicated as section 201 of code 200. To initialize the value in third register 106 to the value of the coefficient $a_N$, third register 106 is cleared to have the value 0 (indicated in code 200 as line 202). Furthermore, integer value 1 is selected as the initial value for first operand 112 and this initial value of first operand 112 is stored in first register 102 (indicated in code 200 as line 204). Additionally, the value of coefficient $a_N$ is selected as the initial value for second operand 114 and this initial value of second operand 114 is stored in second register 104 (indicated in code 200 as line 206). An initial MAC operation is subsequently executed (indicated in code 200 as line 208), thereby multiplying first operand 112 (having the initial value 1) and second operand 114 (having the initial value of coefficient $a_N$) to yield product 116 (having the value of coefficient $a_N$). Product 116 is added to the currently-stored value in third register 106 (which is 0 since third register 106 was cleared at line 202 of code 200). As such, the initial sum 118 generated by adder 110 has the value of coefficient $a_N$, and this is stored as the initial value of third register 106 (e.g. indicated in Horner's method above as $z_0 = a_N$). As indicated in code 200, it is assumed that circuit 100 is equipped with a control register (indicated as "ctr" in line 208 of code 200), which programming allows third register 106 to be updated with the value of sum 118.

Since arithmetic operands usually include a plurality of pipeline stages (e.g. to reduce power consumption), a plurality of clock cycles may be required for the calculation of sum 118. In other words, the controller (e.g. core or digital signal processor) controlling circuit 100 may have to wait a plurality of clock cycles before having access to sum 118 stored in third register 106. This plurality of clock cycles is indicated in code 200 as lines 210, and starts from, and includes, access to the relevant control register. It is noted that access to the relevant control register occurs at line 208 of code 200.

Following initialization of circuit 100, Horner's method can be executed in N iterations. The execution of Horner's method is indicated as section 203 of code 200. At the $i^{th}$ iteration, the value stored in third register 106 is updated according to the equation $z_i = z_{i-1} \cdot x_S + a_{N-i}$. As seen from this equation, at the $i^{th}$ iteration, the currently-stored value in third register 106 (indicated as $z_{i-1}$ and which is the accumulated sum stored in third register 106 at the $(i-1)^{th}$ iteration) is multiplied with the specific value $x_S$ of the argument. The result of this multiplication is summed with the coefficient $a_{N-1}$ of polynomial p(x). The result of the addition is then stored in third register 106 as the accumulated sum at the $i^{th}$ iteration (indicated as $z_i$).

For circuit 100, the calculation of $z_i = z_{i-1} \cdot x_S + a_{N-i}$ is performed in two steps. In the first step, the value stored in third register 106 is updated according to the equation $z' = z_{i-1} \cdot x_S + 0$, where z' is an intermediate value stored in third register 106. In the second step, the value stored in third register 106 is updated according to the equation $z_i = a_{N-i} \cdot 1 + z'$. The combination of these two steps yields $z_i = a_{N-i} \cdot 1 + z_{i-1} \cdot x_S + 0 = z_{i-1} \cdot x_S + a_{N-i}$.

The first step is indicated as section 203-1 of code 200. For the first step, at the start of the $i^{th}$ iteration (where i=1, 2, ... N), the currently-stored value in third register 106 (e.g. $z_{i-1}$) is selected (e.g. by a controller) as the value for first operand 112 and this value of first operand 112 is stored in first register 102 (indicated in code 200 as line 212). Additionally, the specific value $x_S$ of the argument is selected (e.g. by a controller) as the value for second operand 114 and this value of second operand 114 is stored in second register 104 (indicated in code 200 as line 214). Furthermore, third register 106 is cleared (e.g. to have value 0). The clearing of third register 106 is indicated in code 200 as line 216. The first step is subsequently executed (indicated in code 200 as line 218), thereby multiplying first operand 112 (having the value of $z_{i-1}$) and second operand 114 (having the value $x_S$) to yield product 116 (having the value $z_{i-1} \cdot x_S$). Product 116 is added to the value currently stored in third register 106 (having value 0), thus setting sum 118 to the value $z_{i-1} \cdot x_S + 0$. Sum 118 is then stored in third register 106 as the intermediate value z'. A plurality of clock cycles may be needed before having access to intermediate value z' stored in third register 106. This plurality of clock cycles is indicated in code 200 as lines 220, and starts from, and includes, access to the relevant control register (which in the first step occurs at line 218 of code 200).

The second step is indicated as section 203-2 of code 200. For the second step, the value of coefficient $a_{N-i}$ is selected (e.g. by a controller) as the value for first operand 112 and this value of first operand 112 is stored in first register 102 (indicated in code 200 as line 222). Additionally, the integer value 1 is selected (e.g. by a controller) as the value for second operand 114 and this value of second operand 114 is stored in second register 104 (indicated in code 200 as line 224). The second step is subsequently executed (indicated in code 200 as line 226), thereby multiplying first operand 112 (having the value of $a_{N-i}$) and second operand 114 (having the value 1) to yield product 116 (having the value $a_{N-i}$). Product 116 is added to the value currently stored in third register 106 (having value $z_{i-1} \cdot x_S$ from the first step), thus setting the sum 118 to the value $z_{i-1} \cdot x_S + a_{N-i}$. Sum 118 is then stored in third register 106 as the accumulated sum at the $i^{th}$ iteration (indicated as $z_i$). A plurality of clock cycles may be needed before having access to the accumulated sum at the $i^{th}$ iteration, $z_i$, stored in third register 106. This plurality of clock cycles is indicated in code 200 as lines 228, and starts from, and includes, access to the relevant control register (which in the first step occurs at line 226 of code 200).

The above-described two-step MAC operation is performed for each of the iterations i=1, 2, . . . , N. Following execution of the N iterations, the value stored in third register 106 is $p(x_S)$, and this value may be read from third register 106 (indicated in code 200 as line 230). A metric that is indicative of the efficiency of circuit 100 can be defined. In particular, the metric can indicate the number of computational steps required to evaluate polynomial p(x) about the point $x=x_S$. As such, the larger the metric for circuit 100, the lesser is its efficiency since more computational steps are required to evaluate the value $p(x_S)$. Suppose $N_{CALC}$ is the number of clock cycles required for the calculation of the MAC operation output starting from, and including, the access to the relevant control register. In other words, suppose $N_{CALC}$ is the number of clock cycles associated with each combination of lines 208 and 210; lines 218 and 220; and lines 226 and 228. Also suppose that $N_{LOAD}$ is the number of instructions required by a controller (e.g. a core or digital signal processor) to access a register storing a floating-point number of a given precision (e.g. first register 102, second register 104, or third register 106). In other words, suppose $N_{LOAD}$ is the number of instructions required for each of lines 204, 206, 212, 214, 222, 224, and 230. Consequently, the total number of cycles required by a controller to evaluate the N-degree polynomial p(x) about the point $x=x_S$ using code 200 and circuit 100 can be expressed as $N_{POLY1}=1+3\cdot N_{LOAD}+N_{CALC}+N\cdot(1+4\cdot N_{LOAD}+2\cdot N_{CALC})$.

Figure 3:
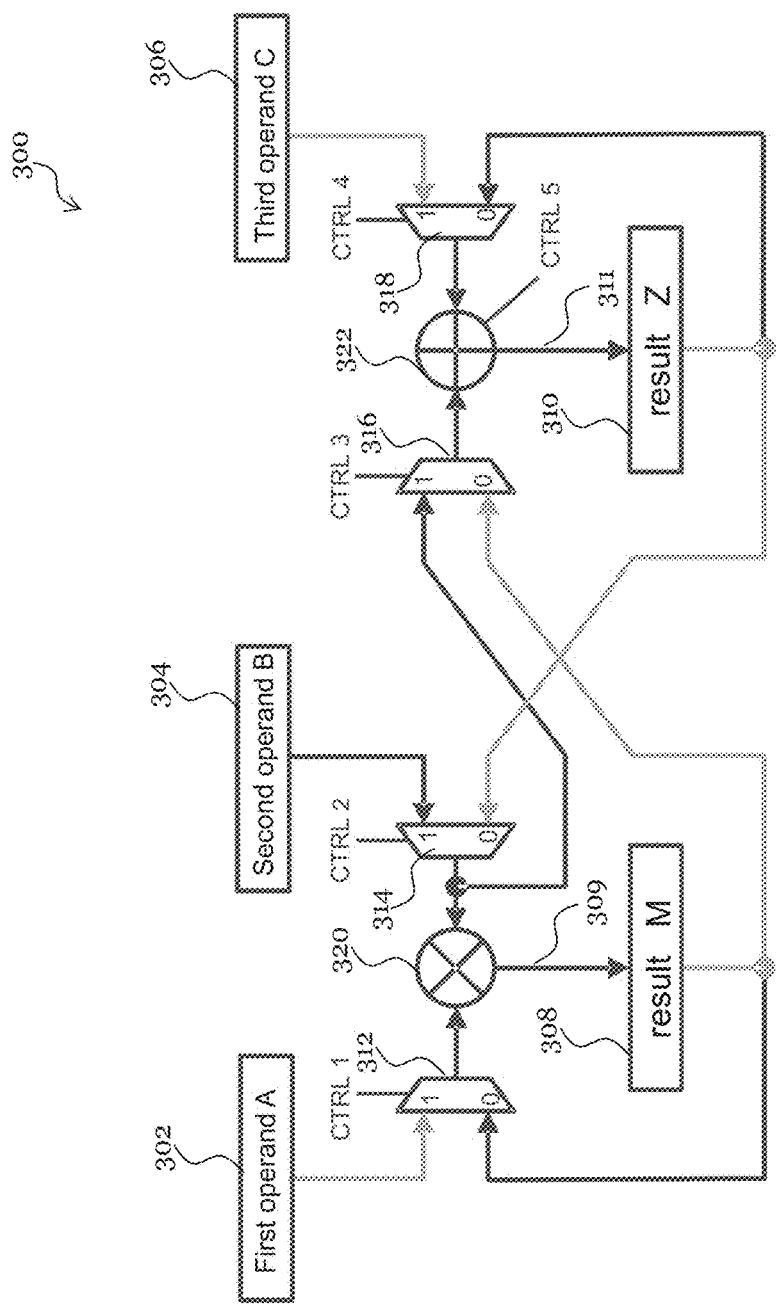
FIG. 3 shows a circuit including a plurality of registers, a plurality of selection units, a multiplier, and an adder, in accordance with an embodiment.

FIG. 3 shows a circuit 300 including a plurality of registers 302, 304, 306, 308, and 310; a plurality of selection units 312, 314, 316, and 318; a multiplier 320; and an adder 322, in accordance with an embodiment. The plurality of selection units 312 and 314 may be configured to selectively provide one of their respective inputs to multiplier 320. Similarly, the plurality of selection units 316 and 318 may be configured to selectively provide one of their respective inputs to adder 322. In some embodiments, the plurality of selection units 312, 314, 316, 318 may be implemented using multiplexers. Circuit 300 may be used to perform a plurality of atomic arithmetic operations and may also be used to perform Horner's method of evaluating polynomial p(x) more efficiently compared to circuit 100 shown in FIG. 1. In particular, compared to circuit 100 shown in FIG. 1, circuit 300 uses a smaller number of computational steps to evaluate polynomial p(x) about the point $x=x_S$, even though circuit 300 has increased logic (e.g. a greater number of circuit components) compared to circuit 100 in FIG. 1. As such, circuit 300 may be used in a digital signal processor as a hardware accelerator for a microcontroller to increase computational efficiency.

Circuit 300 includes first operand register 302, second operand register 304, and third operand register 306. As shown in FIG. 3, first operand register 302 is configured to store a first operand A; second operand register 304 is configured to store a second operand B; and third operand register 306 is configured to store a third operand C. Each of first operand A, second operand B, and third operand C may be a floating-point number of a given precision. For example, each of first operand A, second operand B, and third operand C may be a 16-bit floating-point number.

Circuit 300 also includes first result register 308 and second result register 310. In some examples, each of first result register 308 and second result register 310 may be an accumulator register. In such examples, first result register 308 and second result register 310 may respectively be referred to as a first accumulator register and a second accumulator register. Circuit 300 includes a multiplier 320 and an adder 322. First result register 308 is configured to store a product 309 generated by multiplier 320. The product 309 stored in first result register 308 is indicated in FIG. 3 as "result M" and may also be referred to as the accumulated product stored in first result register 308. Second result register 310 is configured to store a sum 311 generated by adder 322. The sum 311 stored in second result register 310 is indicated in FIG. 3 as "result Z" and may be referred to as the accumulated sum stored in second result register 310. Multiplier 320 and adder 322 may be respectively implemented by multiplier circuits and adder circuits known in the art.

As shown in FIG. 3, circuit 300 includes a first selection unit 312. First operand register 302 and first result register 308 may be coupled to inputs of first selection unit 312. First selection unit 312 may be configured to select and to provide, to multiplier 320, either product 309 stored in first result register 308 or first operand A stored in first operand register 302. As shown in FIG. 3, first selection unit 312 may receive a first control signal CTRL1 (e.g. from a controller). In response to first control signal CTRL1 being at a first value (e.g. the example in FIG. 3 being value "1"), first selection unit 312 may provide first operand A to multiplier 320. Alternatively, in response to first control signal CTRL1 being at a second value (e.g. the example in FIG. 3 being value "0"), first selection unit 312 may provide product 309 stored in first result register 308 to multiplier 320.

Circuit 300 includes a second selection unit 314. Second operand register 304 and second result register 310 may be coupled to inputs of second selection unit 314. Second selection unit 314 may be configured to select and to provide, to multiplier 320, either sum 311 stored in second result register 310 or second operand B stored in second operand register 304. As shown in FIG. 3, second selection unit 314 may receive a second control signal CTRL2 (e.g. from a controller). In response to second control signal CTRL2 being at a first value (e.g. the example in FIG. 3 being value "1"), second selection unit 314 may provide second operand B to multiplier 320. Alternatively, in response to second control signal CTRL2 being at a second value (e.g. the example in FIG. 3 being value "0"), second selection unit 314 may provide sum 311 stored in second result register 310 to multiplier 320.

Circuit 300 includes a third selection unit 316. First result register 308 and output of second selection unit 314 may be coupled to inputs of third selection unit 316. Third selection unit 316 may be configured to select and to provide, to adder 322, either product 309 stored in first result register 308 or the output of second selection unit 314. As shown in FIG. 3, third selection unit 316 may receive a third control signal CTRL3 (e.g. from a controller). In response to third control signal CTRL3 being at a first value (e.g. the example in FIG. 3 being value "1"), third selection unit 316 may provide the output of second selection unit 314 to adder 322. Alternatively, in response to third control signal CTRL3 being at a second value (e.g. the example in FIG. 3 being value "0"), third selection unit 316 may provide product 309 stored in first result register 308 to adder 322.

Circuit 300 includes a fourth selection unit 318. Third operand register 306 and second result register 310 may be coupled to inputs of fourth selection unit 318. Fourth selection unit 318 may be configured to select and to provide, to adder 322, either third operand C stored in third operand register 306 or sum 311 stored in second result register 310. As shown in FIG. 3, fourth selection unit 318 may receive a fourth control signal CTRL4 (e.g. from a controller). In response to fourth control signal CTRL4 being at a first value (e.g. the example in FIG. 3 being value "1"), fourth selection unit 318 may provide third operand C to adder 322. Alternatively, in response to fourth control signal CTRL4 being at a second value (e.g. the example in FIG. 3 being value "0"), fourth selection unit 318 may provide sum 311 stored in second result register 310 to adder 322.

As shown in FIG. 3, adder 322 may receive a fifth control signal CTRL5, which may be configured to cause adder 322 to implement either a subtraction operation or an addition operation. For example, in response to fifth control signal CTRL5 being at a first value, the output of third selection unit 316 and the output of fourth selection unit 318 may be added together. However, in response to fifth control signal CTRL5 being at a second value different from the first value, the output of fourth selection unit 318 may be subtracted from the output of third selection unit 316.

In comparison to circuit 100 in FIG. 1, circuit 300 shown in FIG. 3 has increased logic due to an additional operand register (e.g. third operand register 306), an additional result register (e.g. first result register 308), and selection units 312, 314, 316, and 318. However, the increased logic allows for the storage of intermediate results for both multiplication operations (indicated as "result M" in FIG. 3) and addition operations (indicated as "result Z" in FIG. 3). Furthermore, suitable selection logic (e.g. multiplexing logic) is defined through the use of selection units 312, 314, 316, and 318 to selectively feed values to multiplier 320 and adder 322 of circuit 300. These result in circuit 300 having enhanced flexibility compared to circuit 100, and allows circuit 300 to execute a plurality of arithmetic operations atomically. It is noted that an atomic operation may be a sequence of one or more machine instructions that are executed sequentially, without interruption. Table 1, shown below, illustrates some of the atomic arithmetic operations that can be executed by circuit 300 shown in FIG. 3.

TABLE 1

| Addition | $Z \leftarrow B + C$ |
|---|---|
| Subtraction | $Z \leftarrow B - C$ |
| Recursive addition | $Z \leftarrow Z + C$ |
| Recursive subtraction | $Z \leftarrow Z - C$ |
| M-addition | $Z \leftarrow M + C$ |
| M-subtraction | $Z \leftarrow M - C$ |
| Multiplication | $M \leftarrow A \times B$ |
| Recursive multiplication | $M \leftarrow M \times B$ |
| Z-multiplication | $M \leftarrow Z \times A$ |
| Multiplication and addition | $Z \leftarrow A \times B + C$ |
| Multiplication and subtraction | $Z \leftarrow A \times B - C$ |
| Product accumulation | $Z \leftarrow Z + A \times B$ |
| Horner's operation | $Z \leftarrow Z \times A + C$ |

Referring to the addition operation in Table 1, second operand B stored in second operand register 304 is added to third operand C stored in third operand register 306, and the result of this operation is stored in second result register 310 (indicated as "result Z"), thereby updating the accumulated sum stored in second result register 310. For this addition operation, values for second operand B and third operand C may be respectively latched into second operand register 304 and third operand register 306. Furthermore, second control signal CTRL2, third control signal CTRL3, and fourth control signal CTRL4 may each be set to their respective first values (e.g. the example in FIG. 3 being value "1"). Additionally, fifth control signal CTRL5 may be set such that adder 322 adds the output of third selection unit 316 and the output of fourth selection unit 318. As such, second operand B stored in second operand register 304 is output from second selection unit 314, and this is fed to an input of third selection unit 316. Third selection unit 316 outputs second operand B, received at its input, to adder 322, while fourth selection unit outputs third operand C to adder 322. Adder 322 sums second operand B and third operand C to yield sum 311, which is stored in second result register 310, thereby updating result Z. As such, this sequence of steps implements the addition operation $Z \leftarrow B+C$.

Referring to the subtraction operation in Table 1, third operand C stored in third operand register 306 is subtracted from second operand B stored in second operand register 304, and the result of this operation is stored in second result register 310, thereby updating the accumulated sum stored in second result register 310. For this subtraction operation, values for second operand B and third operand C may be respectively latched into second operand register 304 and third operand register 306. Furthermore, second control signal CTRL2, third control signal CTRL3, and fourth control signal CTRL4 may each be set to their respective first value (e.g. the example in FIG. 3 being value "1"). Additionally, fifth control signal CTRL5 may be set such that adder 322 subtracts the output of fourth selection unit 318 from the output of third selection unit 316. As such, second operand B stored in second operand register 304 is output from second selection unit 314, and this is fed to an input of third selection unit 316. Third selection unit 316 outputs second operand B, received at its input, to adder 322, while fourth selection unit outputs third operand C to adder 322. Adder 322 subtracts third operand C from second operand B to yield sum 311, which is stored in second result register 310, thereby updating result Z. As such, this sequence of steps implements the subtraction operation $Z \leftarrow B-C$.

Referring to the recursive addition operation in Table 1, result Z stored in second result register 310 is added to third operand C stored in third operand register 306, and the result of this operation is stored in second result register 310, thereby updating the accumulated sum stored in second result register 310. For this recursive addition operation, a value for third operand C may be latched into third operand register 306. Furthermore, second control signal CTRL2 may be set to its second value (e.g. the example in FIG. 3 being value "0"), while third control signal CTRL3 and fourth control signal CTRL4 may each be set to their respective first values (e.g. the example in FIG. 3 being value "1"). Additionally, fifth control signal CTRL5 may be set such that adder 322 adds the output of fourth selection unit 318 to the output of third selection unit 316. As such, result Z stored in second result register 310 is output from second selection unit 314, and this is fed to an input of third selection unit 316. Third selection unit 316 outputs result Z, received at its input, to adder 322, while fourth selection unit outputs third operand C to adder 322. Adder 322 sums third operand C and result Z to yield sum 311, which is stored in second result register 310, thereby updating result Z. As such, this sequence of steps implements the recursive addition operation $Z \leftarrow Z+C$.

Referring to the recursive subtraction operation in Table 1, third operand C stored in third operand register 306 is subtracted from result Z stored in second result register 310, and the result of this operation is stored in second result register 310, thereby updating the accumulated sum stored in second result register 310. For this recursive subtraction operation, a value for third operand C may be latched into third operand register 306. Furthermore, second control signal CTRL2 may be set to its second value (e.g. the example in FIG. 3 being value "0"), while third control signal CTRL3 and fourth control signal CTRL4 may each be set to their respective first value (e.g. the example in FIG. 3 being value "1"). Additionally, fifth control signal CTRL5 may be set such that adder 322 subtracts the output of fourth selection unit 318 from the output of third selection unit 316. As such, result Z stored in second result register 310 is output from second selection unit 314, and this is fed to an input of third selection unit 316. Third selection unit 316 outputs result Z, received at its input, to adder 322, while fourth selection unit outputs third operand C to adder 322. Adder 322 subtracts third operand C from result Z to yield sum 311, which is stored in second result register 310, thereby updating result Z. As such, this sequence of steps implements the recursive subtraction operation Z←Z−C.

Referring to the M-addition operation in Table 1, result M stored in first result register 308 is added to third operand C stored in third operand register 306, and the result of this operation is stored in second result register 310, thereby updating the accumulated sum stored in second result register 310. For this M-addition operation, a value for third operand C may be latched into third operand register 306. Furthermore, third control signal CTRL3 may be set to its second value (e.g. the example in FIG. 3 being value "0"), while fourth control signal CTRL4 may be set to its first value (e.g. the example in FIG. 3 being value "1"). Additionally fifth control signal CTRL5 may be set such that adder 322 adds the output of fourth selection unit 318 and the output of third selection unit 316. As such, result M stored in first result register 308 is output from third selection unit 316 to adder 322. Additionally, fourth selection unit 318 outputs third operand C to adder 322. Adder 322 sums third operand C and result M to yield sum 311, which is stored in second result register 310, thereby updating result Z. As such, this sequence of steps implements the M-addition operation Z←M+C.

Referring to the M-subtraction operation in Table 1, third operand C stored in third operand register 306 is subtracted from result M stored in first result register 308, and the result of this operation is stored in second result register 310, thereby updating the accumulated sum stored in second result register 310. For this M-subtraction operation, a value for third operand C may be latched into third operand register 306. Furthermore, third control signal CTRL3 may be set to its second value (e.g. the example in FIG. 3 being value "0"), while fourth control signal CTRL4 may be set to its first value (e.g. the example in FIG. 3 being value "1"). Additionally fifth control signal CTRL5 may be set such that adder 322 subtracts the output of fourth selection unit 318 from the output of third selection unit 316. As such, result M stored in first result register 308 is output from third selection unit 316 to adder 322. Additionally, fourth selection unit 318 outputs third operand C to adder 322. Adder 322 subtracts third operand C from result M to yield sum 311, which is stored in second result register 310, thereby updating result Z. As such, this sequence of steps implements the M-subtraction operation Z←M−C.

Referring to the multiplication operation in Table 1, first operand A stored in first operand register 302 is multiplied with second operand B stored in second operand register 304, and the result of this operation is stored in first result register 308, thereby updating the accumulated product stored in first result register 308. For this multiplication operation, values for first operand A and second operand B may be respectively latched into first operand register 302 and second operand register 304. Furthermore, first control signal CTRL1 and second control signal CTRL2 may each be set to their respective first values (e.g. the example in FIG. 3 being value "1"). As such, first operand A stored in first operand register 302 is output from first selection unit 312 to multiplier 320. Additionally, second selection unit 314 outputs second operand B to multiplier 320. Multiplier 320 multiplies first operand A and second operand B to yield product 309, which is stored in first result register 308, thereby updating result M. As such, this sequence of steps implements the multiplication operation M←A×B.

Referring to the recursive multiplication operation in Table 1, result M stored in first result register 308 is multiplied with second operand B stored in second operand register 304, and the result of this operation is stored in first result register 308, thereby updating the accumulated product stored in first result register 308. For this recursive multiplication operation, a value for second operand B may be latched into second operand register 304. Furthermore, first control signal CTRL1 may be set to its second value (e.g. the example in FIG. 3 being value "0") and second control signal CTRL2 may be set to its first value (e.g. the example in FIG. 3 being value "1"). As such, result M stored in first result register 308 is output from first selection unit 312 to multiplier 320. Additionally, second selection unit 314 outputs second operand B to multiplier 320. Multiplier 320 multiplies result M and second operand B to yield product 309, which is stored in first result register 308, thereby updating result M. As such, this sequence of steps implements the recursive multiplication operation M←M×B.

Referring to the Z-multiplication operation in Table 1, result Z stored in second result register 310 is multiplied with first operand A stored in first operand register 302, and the result of this operation is stored in first result register 308, thereby updating the accumulated product stored in first result register 308. For this Z-multiplication operation, a value for first operand A may be latched into first operand register 302. Furthermore, first control signal CTRL1 may be set to its first value (e.g. the example in FIG. 3 being value "1") and second control signal CTRL2 may be set to its second value (e.g. the example in FIG. 3 being value "0"). As such, first operand A stored in first operand register 302 is output from first selection unit 312 to multiplier 320. Additionally, second selection unit 314 outputs result Z to multiplier 320. Multiplier 320 multiplies result Z and first operand A to yield product 309, which is stored in first result register 308, thereby updating result M. As such, this sequence of steps implements the Z-multiplication multiplication operation M←Z×A.

Referring to the multiplication-and-addition operation in Table 1, first operand A stored in first operand register 302 is multiplied with second operand B stored in second operand register 304 to yield product 309, which is subsequently added to third operand C stored in third operand register 306 to yield sum 311. Sum 311 is stored in second result register 310, thereby updating the accumulated sum stored in second result register 310. For this multiplication-and-addition operation, values for first operand A, second operand B, and third operand C may be respectively latched into first operand register 302, second operand register 304, and third operand register 306. Furthermore, first control signal CTRL1, second control signal CTRL2, and fourth control signal CTRL4 may each be set to their respective first values (e.g. the example in FIG. 3 being value "1"). Third control signal CTRL3 may be set to its second value (e.g. the example in FIG. 3 being value "0"). Additionally, fifth control signal CTRL5 may be set such that adder 322 adds the output of third selection unit 316 and the output of fourth selection unit 318. As such, first operand A stored in first operand register 302 is output from first selection unit 312 to multiplier 320. Additionally, second selection unit 314 outputs second operand B stored in second operand register 304 to multiplier 320. Multiplier 320 multiplies first operand A and second operand B to yield product 309, which is stored in first result register 308 as result M. Result M is subsequently output from third selection unit 316 to adder 322, while third operand C stored in third operand register 306 is output from fourth selection unit 318 to adder 322. Adder 322 sums result M and third operand C to yield sum 311, which is stored in second result register 310, thereby updating result Z. As such, this sequence of steps implements the multiplication-and-addition operation Z←A×B+C.

Referring to the multiplication-and-subtraction operation in Table 1, first operand A stored in first operand register 302 is multiplied with second operand B stored in second operand register 304 to yield product 309. Third operand C stored in third operand register 306 is subsequently subtracted from product 309 to yield sum 311. Sum 311 is stored in second result register 310, thereby updating the accumulated sum stored in second result register 310. For this multiplication-and-subtraction operation, values for first operand A, second operand B, and third operand C may be respectively latched into first operand register 302, second operand register 304, and third operand register 306. Furthermore, first control signal CTRL1, second control signal CTRL2, and fourth control signal CTRL4 may each be set to their respective first values (e.g. the example in FIG. 3 being value "1"). Third control signal CTRL3 may be set to its second value (e.g. the example in FIG. 3 being value "0"). Additionally, fifth control signal CTRL5 may be set such that adder 322 subtracts the output of fourth selection unit 318 from the output of third selection unit 316. As such, first operand A stored in first operand register 302 is output from first selection unit 312 to multiplier 320. Additionally, second selection unit 314 outputs second operand B to multiplier 320. Multiplier 320 multiplies first operand A and second operand B to yield product 309, which is stored in first result register 308 as result M. Result M is subsequently output from third selection unit 316 to adder 322, while third operand C stored in third operand register 306 is output from fourth selection unit 318 to adder 322. Adder 322 subtracts third operand C from result M to yield sum 311, which is stored in second result register 310, thereby updating result Z. As such, this sequence of steps implements the multiplication-and-subtraction operation Z←A×B−C.

Referring to the product accumulation operation in Table 1, first operand A stored in first operand register 302 is multiplied with second operand B stored in second operand register 304 to yield product 309. Product 309 is subsequently added to result Z stored in second result register 310 to yield sum 311. Sum 311 is stored in second result register 310, thereby updating the accumulated sum stored in second result register 310. For this product accumulation operation, values for first operand A and second operand B may be respectively latched into first operand register 302 and second operand register 304. Furthermore, first control signal CTRL1 and second control signal CTRL2 may each be set to their respective first values (e.g. the example in FIG. 3 being value "1"). Third control signal CTRL3 and fourth control signal CTRL4 may each be set to their respective second values (e.g. the example in FIG. 3 being value "0"). Additionally, fifth control signal CTRL5 may be set such that adder 322 sums the output of fourth selection unit 318 and the output of third selection unit 316. As such, first operand A stored in first operand register 302 is output from first selection unit 312 to multiplier 320. Additionally, second selection unit 314 outputs second operand B to multiplier 320. Multiplier 320 multiplies first operand A and second operand B to yield product 309, which is stored in first result register 308 as result M. Result M is subsequently output from third selection unit 316 to adder 322, while result Z stored in second result register 310 is output from fourth selection unit 318 to adder 322. Adder 322 adds result M and result Z to yield sum 311, which is stored in second result register 310, thereby updating result Z. As such, this sequence of steps implements the product accumulation operation Z←Z+A×B.

Finally, referring to Horner's operation in Table 1, first operand A stored in first operand register 302 is multiplied with result Z stored in second result register 310 to yield product 309. Product 309 is subsequently added to third operand C stored in third operand register 306 to yield sum 311. Sum 311 is stored in second result register 310, thereby updating the accumulated sum stored in second result register 310. For this Horner's operation, values for first operand A and third operand C may be respectively latched into first operand register 302 and third operand register 306. Furthermore, first control signal CTRL1 and fourth control signal CTRL4 may each be set to their respective first values (e.g. the example in FIG. 3 being value "1"). Second control signal CTRL2 and third control signal CTRL3 may each be set to their respective second values (e.g. the example in FIG. 3 being value "0"). Additionally, fifth control signal CTRL5 may be set such that adder 322 sums the output of fourth selection unit 318 and the output of third selection unit 316. As such, first operand A stored in first operand register 302 is output from first selection unit 312 to multiplier 320. Additionally, second selection unit 314 outputs result Z stored in second result register 310 to multiplier 320. Multiplier 320 multiplies first operand A and result Z to yield product 309, which is stored in first result register 308 as result M. Result M is subsequently output from third selection unit 316 to adder 322, while third operand C stored in third operand register 306 is output from fourth selection unit 318 to adder 322. Adder 322 adds result M and operand C to yield sum 311, which is stored in second result register 310, thereby updating result Z. As such, this sequence of steps implements Horner's operation Z←Z×A+C.

Table 1 indicates that circuit 300 is configured to implement Horner's method of evaluating polynomial $p(x)=a_N \cdot x^N + a_{N-1} \cdot x^{N-1} + \ldots + a_1 \cdot x + a_0$. In particular, circuit 300 may be used to determine the value $p(x_S)$, which is the value of polynomial $p(x)$ when argument x is equal to specific value $x_S$.

FIG. 4 shows an example of code 400 that implements Horner's method of evaluating polynomial $p(x)$ using circuit 300, in accordance with an embodiment. During an initialization of circuit 300, the value in second result register 310 is initialized to the value of $z_0 = a_N \cdot x_S + a_{N-1}$. The initialization of circuit 300 is indicated as section 401 of code 400. To initialize the value in second result register 310 to the value $z_0 = a_N \cdot x_S + a_{N-1}$, a multiply-and-add operation is performed by circuit 300. In particular, the values $x_S$, $a_N$, and $a_{N-1}$ are selected (e.g. by a controller) for first operand A, second operand B, and third operand C, respectively. Subsequently, first operand A (having value $x_S$) is latched into first operand register 302, which is indicated in code 400 as line 402. Second operand B (having value $a_N$) is latched into second operand register 304, which is indicated in code 400 as line 404. Third operand C (having value $a_{N-1}$) is latched into third operand register 306, which is indicated in code 400 as line 406. Following the latching of first operand A, second operand B, and third operand C into their respective registers, circuit 300 executes the multiply-and-add operation, as described above in relation to Table 1 and circuit 300. The execution of the multiply-and-add operation is indicated in code 400 as line 408. In particular, first operand A (having value $x_S$) is output from first selection unit 312 to multiplier 320. Additionally, second selection unit 314 outputs second operand B (having value $a_N$) to multiplier 320. Multiplier 320 multiplies first operand A and second operand B to yield product 309 (having value $a_N \cdot x_S$), which is stored in first result register 308 as result M. Result M is subsequently output from third selection unit 316 to adder 322, while third operand C (having value $a_{N-1}$) is output from fourth selection unit 318 to adder 322. Adder 322 sums result M and third operand C to yield sum 311 (having value $a_N \cdot x_S + a_{N-1}$), which is stored in second result register 310, thereby updating result Z. As indicated in code 400, it is assumed that circuit 300 is equipped with a control register (indicated as "ctr" in line 408 of code 400), which programming allows second result register 310 to be updated with the value of sum 311 of adder 322. A plurality of clock cycles may be needed before having access to the initial value stored in second result register 310. This plurality of clock cycles is indicated in code 400 as lines 410, and starts from, and includes, access to the relevant control register (which in the initialization step occurs at line 408 of code 400).

Following initialization of circuit 300, Horner's method can be executed in N−1 iterations. The execution of Horner's method is indicated as section 403 of code 400. At the $i^{th}$ iteration (where i=1, 2, ..., N−1), the accumulated sum stored in second result register 310 is updated according to the equation $z_{i+1} = z_i \cdot x_S + a_{N-1-i}$. In particular, the value $a_{N-1-i}$ is selected (e.g. by a controller) for third operand C. Subsequently, third operand C (having value $a_{N-1-i}$) is latched into third operand register 306, which is indicated in code 400 as line 412. Horner's method is then executed, and this is indicated in code 400 as line 414. In particular, first operand A (having value $x_S$ and stored in first operand register 302) is output from first selection unit 312 to multiplier 320. Additionally, second selection unit 314 outputs result Z (having value $z_i$ and stored in second result register 310) to multiplier 320. Multiplier 320 multiplies first operand A and result Z to yield product 309 (having value $z_i \cdot x_S$), which is stored in first result register 308 as result M. Result M is subsequently output from third selection unit 316 to adder 322, while third operand C (having value $a_{N-1-i}$ and stored in third operand register 306) is output from fourth selection unit 318 to adder 322. Adder 322 adds result M and operand C to yield sum 311, which has a value $z_i \cdot x_S + a_{N-1-i}$. Sum 311 is stored in second result register 310, thereby updating result Z. The controller (e.g. core or digital signal processor) controlling circuit 300 may have to wait a plurality of clock cycles before having access to sum 311 of adder 322. This plurality of clock cycles is indicated in code 400 as lines 416, and starts from, and includes, access to the relevant control register (which occurs at line 414 of code 400). Following execution of the N-i iterations of Horner's method, the value stored in second result register 310 is $p(x_S)$, and this value may be read from second result register 310 (indicated in code 400 as line 418).

A metric that is indicative of the efficiency of circuit 300 can be defined. In particular, the metric can indicate the number of computational steps required to evaluate polynomial p(x) about the point $x=x_S$. As such, the larger the metric for circuit 300, the lesser is its efficiency since more computational steps are required to evaluate the value $p(x_S)$. Similar to the metric defined above in respect of circuit 100 in FIG. 1, suppose the same controller is used in conjunction with each of circuit 100 and circuit 300. Then, $N_{CALC}$ is the number of clock cycles required for the calculation of the MAC operation output starting from, and including, the access to the relevant control register. In other words, $N_{CALC}$ is the number of clock cycles associated with each combination of lines 408 and 410; and lines 414 and 416. Also suppose that $N_{LOAD}$ is the number of instructions required by the controller to access a register holding a floating-point number of a given precision (e.g. first operand register 302, second operand register 304, or third operand register 306). In other words, $N_{LOAD}$ is the number of instructions required for each of lines 402, 404, 406, 412, and 418. Consequently, the total number of cycles required by the processor to evaluate the N-degree polynomial p(x) using code 400 and circuit 300 can be expressed as $N_{POLY2} = 3 \cdot N_{LOAD} + N \cdot (N_{LOAD} + N_{CALC})$.

The efficiency of circuit 300 relative to circuit 100 can be compared by defining a ratio of $N_{POLY1}$ to $N_{POLY2}$. In particular, suppose ratio $R_{poly}(N) = N_{POLY1}/N_{POLY2}$. A larger ratio $R_{poly}(N)$ may indicate that the efficiency of circuit 300 is greater than the efficiency of circuit 100, since circuit 300 used a lesser number of computational steps, compared to circuit 100, to evaluate polynomial p(x) about the point $x=x_S$. Considering that in most applications (e.g. proximity detection, synchronization of the times of arrival of data packets, and error-control coding), the degree N of polynomial p(x) is greater than 10, it can be assumed that ratio $R_{poly}(N)$ is invariant with respect to the polynomial degree N. As such, ratio $R_{poly}(N)$ may be approximated as $R_{poly} \approx (1 + 4 \cdot N_{LOAD} + 2 \cdot N_{CALC})/(N_{LOAD} + N_{CALC})$. As described above, ratio $R_{poly}$ is a measure of performance enhancement provided by circuit 300 relative to circuit 100 with regards to computation of the N-degree polynomial p(x), where N is greater than 10. Table 2, shown below, illustrates the values for ratio $R_{poly}$ as a function of $N_{LOAD}$ and $N_{CALC}$.

TABLE 2

| $R_{poly}$ | | $N_{load}$ | | | |
|---|---|---|---|---|---|
| | | 1 | 2 | 4 | 8 |
| $N_{calc}$ | 1 | 3 | 3.33 | 3.6 | 3.78 |
| | 2 | 2.67 | 3 | 3.33 | 3.6 |
| | 3 | 2.5 | 2.8 | 3.14 | 3.45 |
| | 4 | 2.4 | 2.67 | 3 | 3.33 |
| | 5 | 2.33 | 2.57 | 2.89 | 3.23 |
| | 6 | 2.29 | 2.5 | 2.8 | 3.14 |
| | 7 | 2.25 | 2.44 | 2.73 | 3.07 |
| | 8 | 2.22 | 2.4 | 2.67 | 3 |

As shown in Table 2, ratio $R_{poly}$ is greater than 2, and in some cases of $N_{LOAD}$ and $N_{CALC}$, greater than 3. This signifies circuit 100 requires at least twice the number of computational steps to evaluate N-degree polynomial p(x) than circuit 300. It is also seen in Table 2 that for a given value $N_{CALC}$, ratio $R_{poly}$ increases with $N_{LOAD}$. This signifies that the efficiency of circuit 300 increases (relative to circuit 100) in cases of small processors handling large floating-point numbers. As an example, loading an operand register (e.g. first operand register 302, second operand register 304, or third operand register 306) may be performed by an 8-bit controller (e.g. an 8-bit core such as an 8051 microprocessor) and may require 8 cycles to load or read a 64-bit double-precision floating-point operand (e.g. first operand A, second operand B, or third operand C). A similar number of cycles may be needed to load or read a 64-bit double-precision floating-point result (e.g. result M or result Z shown in FIG. 3). In such an example, $N_{LOAD}$ may be equal to 8. It is noted that although this example is directed to IEEE 754 double-precision floating-point operands and results, circuit 300 may also be used with fixed-point and/or single-precision floating-point operands and results. As an another example, in an embodiment where IEEE Standard for Floating-Point Arithmetic (IEEE 754) MAC architecture is instantiated under Extended Special Function Register (ESFR) space of an 8-bit microprocessor (e.g. an M8051EW microprocessor), $N_{LOAD}$ may be equal to 4, while $N_{CALC}$ may be equal to 7 (e.g. assuming a MAC data path including 6 pipelined stages). In such an example, ratio $R_{poly}$ is about 2.73 (as indicated above in Table 2), signifying that circuit 300 utilizes less than half the number of computational steps, compared to circuit 100, to evaluate the N-degree polynomial p(x) about the point $x=x_S$.

Embodiment circuit 300 provides several effects. Although circuit 300 has increased logic compared to circuit 100 (e.g. due to additional circuit components), circuit 300 can store intermediate results for both multiplication operations and addition operations and has suitable selection logic (e.g. multiplexing logic) to selectively feed values to a multiplier and an adder. The storage of intermediate results for both multiplication operations and addition operations may be absent in circuit 100. Furthermore, circuit 100 may not be configured to selectively feed values to a multiplier and an adder. Additionally, circuit 300 has enhanced flexibility compared to circuit 100, since circuit 300 can execute a plurality of arithmetic operations atomically. Even further, circuit 300 is more efficient at polynomial evaluation, permitting half (or, in some cases, less than half) the number of computational steps required by circuit 100 to evaluate a polynomial.

In an embodiment, a circuit includes a multiplier, an adder, a first result register coupled to an output of the multiplier, and a second result register coupled to an output the adder. The circuit further includes a first selection unit configured to selectively provide, to the multiplier and in response to a first control signal, a first value from a first plurality of values. The circuit additionally includes a second selection unit configured to selectively provide, to the multiplier and in response to a second control signal, a second value from a second plurality of values. The circuit also includes a third selection unit configured to selectively provide, to the adder and in response to a third control signal, a third value from a third plurality of values. The circuit further includes a fourth selection unit configured to selectively provide, to the adder and in response to a fourth control signal, a fourth value from a fourth plurality of values.

In an embodiment, a circuit includes a multiplier, a first accumulator register coupled to an output of the multiplier, an adder, and a second accumulator register coupled to an output of the adder. A first multiplexer, included in the circuit, is configured to receive, at a first input, a first operand and, at a second input, an accumulated product stored in the first accumulator register, the first multiplexer being further configured to selectively provide, as a first input to the multiplier, one of the first operand or the accumulated product. A second multiplexer, included in the circuit is configured to receive, at a first input, a second operand and, at a second input, an accumulated sum stored in the second accumulator register, the second multiplexer being further configured to selectively provide, as a second input to the multiplier, one of the second operand or the accumulated sum. A third multiplexer, included in the circuit, is configured to receive, at a first input, an output of the second multiplexer and, at a second input, the accumulated product, the third multiplexer being further configured to selectively provide, as a first input to the adder, one of the output of the second multiplexer or the accumulated product. A fourth multiplexer, included in the circuit, is configured to receive, at a first input, a third operand and, at a second input, the accumulated sum, the fourth multiplexer further configured to selectively provide, as a second input to the adder, one of the third operand or the accumulated sum.

In an embodiment, a device may include a processor and a computer-readable storage medium storing a program to be executed by the processor. The program may include instructions for evaluating an N-degree polynomial p(x) when an argument of the polynomial p(x) is equal to a value $x_S$. The instructions may include selecting, by a first multiplexer, the value $x_S$ from a first plurality of values including the value $x_S$ and an accumulated product stored in a first accumulator register. The instructions also include selecting, by a second multiplexer, an accumulated sum stored in a second accumulator register from a second plurality of values including a second operand and the accumulated sum. The instructions further include multiplying, by a multiplier, the value $x_S$ and the accumulated sum to yield a product; and selecting, by a third multiplexer, the product from a third plurality of values including the product and an output of the second multiplexer. The instructions additionally include selecting, by a fourth multiplexer, a third operand from a fourth plurality of values including the third operand and the accumulated sum, the third operand being equal to a value of a coefficient of the polynomial p(x). The instructions also include summing, by an adder, the product and the third operand to yield an addition result; and storing the addition result in the second accumulator register, the accumulated sum being updated to equal the addition result.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The devices and processing systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a processor, a digital signal processor (DSP), an Application Specific Integrated Circuit (ASIC), a field programmable gate array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A circuit, comprising:
a multiplier;
an adder;
a first result register coupled to an output of the multiplier;
a second result register coupled to an output the adder;
a first selection unit configured to selectively provide, to the multiplier and in response to a first control signal, a first value from a first plurality of values;
a second selection unit configured to selectively provide, to the multiplier and in response to a second control signal, a second value from a second plurality of values;
a third selection unit configured to selectively provide, to the adder and in response to a third control signal, a third value from a third plurality of values, wherein the first plurality of values comprises a first operand and an accumulated product stored in the first result register; and
a fourth selection unit configured to selectively provide, to the adder and in response to a fourth control signal, a fourth value from a fourth plurality of values.

2. The circuit of claim 1, further comprising a first operand register configured to store the first operand, the first operand register coupled to a first input of the first selection unit.

3. The circuit of claim 1, wherein an output of the first result register is coupled to a second input of the first selection unit.

4. The circuit of claim 1, wherein the second plurality of values comprises a second operand and an accumulated sum stored in the second result register.

5. The circuit of claim 4, further comprising a second operand register configured to store the second operand, the second operand register coupled to a first input of the second selection unit.

6. The circuit of claim 4, wherein an output of the second result register is coupled to a second input of the second selection unit.

7. The circuit of claim 1, wherein the third plurality of values comprises an output of the second selection unit and an accumulated product stored in the first result register.

8. The circuit of claim 7, wherein an output of the second selection unit is coupled to a first input of the third selection unit, and wherein an output of the first result register is coupled to a second input of the third selection unit.

9. The circuit of claim 1, wherein the fourth plurality of values comprises a third operand and an accumulated sum stored in the second result register.

10. The circuit of claim 9, further comprising a third operand register configured to store the third operand, the third operand register coupled to a first input of the fourth selection unit.

11. The circuit of claim 9, wherein an output of the second result register is coupled to a second input of the fourth selection unit.

12. A circuit, comprising:
a multiplier;
a first accumulator register coupled to an output of the multiplier;
an adder;
a second accumulator register coupled to an output of the adder;
a first multiplexer configured to receive, at a first input, a first operand and, at a second input, an accumulated product stored in the first accumulator register, the first multiplexer further configured to selectively provide, as a first input to the multiplier, one of the first operand or the accumulated product;
a second multiplexer configured to receive, at a first input, a second operand and, at a second input, an accumulated sum stored in the second accumulator register, the second multiplexer further configured to selectively provide, as a second input to the multiplier, one of the second operand or the accumulated sum;
a third multiplexer configured to receive, at a first input, an output of the second multiplexer and, at a second input, the accumulated product, the third multiplexer further configured to selectively provide, as a first input to the adder, one of the output of the second multiplexer or the accumulated product; and
a fourth multiplexer configured to receive, at a first input, a third operand and, at a second input, the accumulated sum, the fourth multiplexer further configured to selectively provide, as a second input to the adder, one of the third operand or the accumulated sum.

13. The circuit of claim 12, further comprising a controller configured to provide a first control signal to the first multiplexer, a second control signal to the second multiplexer, a third control signal to the third multiplexer, and a fourth control signal to the fourth multiplexer, wherein the first multiplexer, the second multiplexer, third multiplexer, and fourth multiplexer are configured to selectively provide in response to the first control signal, the second control signal, the third control signal, and the fourth control signal, respectively.

14. The circuit of claim 13, wherein the controller is further configured to provide a fifth control signal to the adder, wherein the first input to the adder and the second input to the adder are summed in response to the fifth control signal being at a first value, and wherein the second input of the adder is subtracted from the first input of the adder in response to the fifth control signal being at a second value different from the first value.

15. The circuit of claim 12, wherein each of the first operand, the second operand, and the third operand is a floating-point number.

16. A device, comprising:
a processor; and
a non-transitory computer-readable storage medium storing a program to be executed by the processor, the program including instructions for evaluating an N-degree polynomial p(x) when an argument of the polynomial p(x) is equal to a value xS, the program including instructions for:
selecting, by a first multiplexer, the value xS from a first plurality of values comprising the value xS and an accumulated product stored in a first accumulator register;
selecting, by a second multiplexer, an accumulated sum stored in a second accumulator register from a second plurality of values comprising a second operand and the accumulated sum;
multiplying, by a multiplier, the value xS and the accumulated sum to yield a product;
selecting, by a third multiplexer, the product from a third plurality of values comprising the product and an output of the second multiplexer;
selecting, by a fourth multiplexer, a third operand from a fourth plurality of values comprising the third operand and the accumulated sum, the third operand being equal to a value of a coefficient of the polynomial p(x);
summing, by an adder, the product and the third operand to yield an addition result; and
storing the addition result in the second accumulator register, the accumulated sum being updated to equal the addition result.

17. The device of claim 16, wherein the program further includes instructions for storing an initial sum in the second accumulator register, the initial sum being equal to a sum of an (N−1)th degree coefficient of the polynomial p(x) and a product of the value xS and an Nth degree coefficient of the polynomial p(x).

18. The device of claim 17, wherein storing the initial sum in the second accumulator register is performed prior to selecting, by the first multiplexer, the value xS, and prior to selecting, by the second multiplexer, the accumulated sum.

19. The device of claim 17, wherein storing the initial sum in the second accumulator register comprises:
selecting, by the first multiplexer, the value xS from the first plurality of values comprising the value xS and the accumulated product;
selecting, by the second multiplexer, the second operand from the second plurality of values comprising the second operand and the accumulated sum stored in the second accumulator register, the second operand being equal to the Nth degree coefficient of the polynomial p(x);
multiplying, by the multiplier, the value xS and the second operand to yield an initial product;
selecting, by the third multiplexer, the initial product from the third plurality of values comprising the initial product and the output of the second multiplexer;
selecting, by the fourth multiplexer, the third operand from the fourth plurality of values comprising the third operand and the accumulated sum, the third operand being equal to an (N-i)th degree coefficient of the polynomial p(x);
summing, by then adder, the initial product and the third operand to yield the initial sum; and
storing the initial sum in the second accumulator register, the accumulated sum being updated to equal the initial sum.

* * * * *

UNITED STATES PATENT AND TRADEMARK OFFICE
CERTIFICATE OF CORRECTION

PATENT NO. : 10,089,078 B2
APPLICATION NO. : 15/275037
DATED : October 2, 2018
INVENTOR(S) : David Vincenzoni et al.

It is certified that error appears in the above-identified patent and that said Letters Patent is hereby corrected as shown below:

In the Claims

In Column 22, Line 30, Claim 19, delete "(N-i)th" and insert --(N-1)th--.

Signed and Sealed this
Eleventh Day of December, 2018

Andrei Iancu
*Director of the United States Patent and Trademark Office*